United States Patent
Ferrell et al.

(10) Patent No.: US 11,248,323 B2
(45) Date of Patent: Feb. 15, 2022

(54) METHOD FOR FORMING A NON-WOVEN RECYCLABLE FABRIC

(71) Applicants: Richard Francis Ferrell, Sarasota, FL (US); James Michael Posa, Greer, SC (US); Joseph D. Wahlquist, Georgetown, TX (US)

(72) Inventors: Richard Francis Ferrell, Sarasota, FL (US); James Michael Posa, Greer, SC (US); Joseph D. Wahlquist, Georgetown, TX (US)

(73) Assignee: Purlin, LLC, Sarasota, FL (US)

( * ) Notice: Subject to any disclaimer, the term of this patent is extended or adjusted under 35 U.S.C. 154(b) by 134 days.

(21) Appl. No.: 16/256,803

(22) Filed: Jan. 24, 2019

(65) Prior Publication Data

US 2019/0153643 A1    May 23, 2019

Related U.S. Application Data

(63) Continuation-in-part of application No. 15/469,124, filed on Mar. 24, 2017, now abandoned.

(51) Int. Cl.
    *D01D 1/04*    (2006.01)
    *D02J 13/00*   (2006.01)
    (Continued)

(52) U.S. Cl.
    CPC ............. *D04H 3/16* (2013.01); *A47G 9/0238* (2013.01); *B29C 48/05* (2019.02); *B29C 48/277* (2019.02);
    (Continued)

(58) Field of Classification Search
    CPC ......... B29C 65/08; B29C 65/48; B29C 65/56; B29K 2105/26; D01D 1/04; D01D 5/08; D01D 5/082; D01D 5/088; D01D 5/098; D01D 5/0985; D01D 5/34; D01D 10/02; D01F 6/62; D01F 8/14; D02J 13/00; D04H 1/435; D04H 1/43828; D04H 1/492; D04H 1/54; D04H 1/5412; D04H 1/56;
    (Continued)

(56) References Cited

U.S. PATENT DOCUMENTS

| | | |
|---|---|---|
| 2,156,880 A | 5/1939 | Slomon |
| 3,859,678 A | 1/1975 | Davis |

(Continued)

FOREIGN PATENT DOCUMENTS

| | | |
|---|---|---|
| CN | 1977774 A | 6/2007 |
| DE | 202015005969 | 9/2015 |

(Continued)

OTHER PUBLICATIONS

U.S. Appl. No. 15/096,925, filed Apr. 12, 2016, Ferrell.

(Continued)

*Primary Examiner* — Leo B Tentoni
(74) *Attorney, Agent, or Firm* — Reinhart Boerner Van Deuren P.C.

(57) ABSTRACT

A nonwoven recyclable fabric and associated methods are provided. The fabric is formed from 100% polyester, and may also include surface coatings such as hydrophilic coatings to promote heat transfer as well moisture vapor transmission rates and/or a silicone coating to promote fabric smoothness and reduce abrasiveness of the fabric.

14 Claims, 2 Drawing Sheets

(51) Int. Cl.

| | | |
|---|---|---|
| D04H 1/492 | (2012.01) | |
| D04H 1/54 | (2012.01) | |
| D04H 1/56 | (2006.01) | |
| D04H 3/11 | (2012.01) | |
| D04H 5/02 | (2012.01) | |
| D04H 5/03 | (2012.01) | |
| D04H 5/06 | (2006.01) | |
| D04H 3/16 | (2006.01) | |
| D04H 3/011 | (2012.01) | |
| D04H 3/10 | (2012.01) | |
| D01F 8/14 | (2006.01) | |
| D04H 3/12 | (2006.01) | |
| D01F 13/04 | (2006.01) | |
| D04H 1/559 | (2012.01) | |
| A47G 9/02 | (2006.01) | |
| D04H 1/435 | (2012.01) | |
| D04H 3/14 | (2012.01) | |
| D04H 1/49 | (2012.01) | |
| D01F 6/62 | (2006.01) | |
| B29C 48/05 | (2019.01) | |
| B29C 48/285 | (2019.01) | |
| B29C 48/275 | (2019.01) | |
| D01D 5/098 | (2006.01) | |
| D01D 5/088 | (2006.01) | |
| D01D 5/08 | (2006.01) | |
| D01D 10/02 | (2006.01) | |
| D01D 5/34 | (2006.01) | |
| D04H 1/4382 | (2012.01) | |
| D04H 1/541 | (2012.01) | |
| D01F 11/08 | (2006.01) | |
| D01F 6/92 | (2006.01) | |
| B29K 67/00 | (2006.01) | |
| B29L 31/00 | (2006.01) | |
| B29K 105/00 | (2006.01) | |
| B29C 65/08 | (2006.01) | |
| B29C 65/48 | (2006.01) | |
| B29C 65/56 | (2006.01) | |
| B29K 105/26 | (2006.01) | |

(52) U.S. Cl.
CPC .......... *B29C 48/288* (2019.02); *D01D 5/082* (2013.01); *D01D 5/088* (2013.01); *D01D 5/098* (2013.01); *D01D 5/0985* (2013.01); *D01D 5/34* (2013.01); *D01D 10/02* (2013.01); *D01F 6/62* (2013.01); *D01F 8/14* (2013.01); *D01F 13/04* (2013.01); *D04H 1/435* (2013.01); *D04H 1/43828* (2020.05); *D04H 1/49* (2013.01); *D04H 1/5412* (2020.05); *D04H 1/559* (2013.01); *D04H 3/011* (2013.01); *D04H 3/10* (2013.01); *D04H 3/12* (2013.01); *D04H 3/14* (2013.01); *B29C 48/275* (2019.02); *B29C 48/2886* (2019.02); *B29C 65/08* (2013.01); *B29C 65/48* (2013.01); *B29C 65/56* (2013.01); *B29K 2067/00* (2013.01); *B29K 2105/251* (2013.01); *B29K 2105/26* (2013.01); *B29L 2031/726* (2013.01); *D01F 6/92* (2013.01); *D01F 11/08* (2013.01); *D10B 2331/04* (2013.01); *D10B 2503/06* (2013.01); *D10B 2503/062* (2013.01); *Y02P 20/143* (2015.11); *Y02P 70/62* (2015.11); *Y02W 30/62* (2015.05)

(58) Field of Classification Search
CPC . D04H 3/011; D04H 3/11; D04H 3/16; D04H 5/02; D04H 5/03; D04H 5/06; D10B 2331/04; D10B 2503/06; D10B 2503/062

USPC .. 264/103, 134, 136, 172.15, 172.17, 210.2, 264/210.3, 210.6, 210.8, 211.13, 211.14, 264/211.17, 211.2, 331.21, 442, 517, 518, 264/555, 913, 920; 156/73.1, 167, 181, 156/244.11, 244.23, 244.24; 28/104; 19/98, 296, 299

See application file for complete search history.

(56) References Cited

U.S. PATENT DOCUMENTS

| | | | |
|---|---|---|---|
| 4,345,039 A | 8/1982 | Cowan et al. | |
| 5,072,833 A | 12/1991 | Hansen et al. | |
| 5,111,958 A | 5/1992 | Witthoeft | |
| 5,429,311 A | 7/1995 | Cina et al. | |
| 5,433,390 A | 7/1995 | Keeler et al. | |
| 5,643,515 A * | 7/1997 | Davies .................. | D01F 6/62 264/103 |
| 5,665,300 A * | 9/1997 | Brignola .............. | D04H 3/16 264/555 |
| 5,789,328 A | 8/1998 | Kurihara et al. | |
| 5,919,717 A | 7/1999 | Wallick | |
| 6,037,282 A | 3/2000 | Milding et al. | |
| 6,063,717 A | 5/2000 | Ishiyama et al. | |
| 6,159,882 A | 12/2000 | Kean et al. | |
| 6,184,340 B1 | 2/2001 | Smith et al. | |
| 6,305,920 B1 | 10/2001 | Kean et al. | |
| 6,378,179 B1 | 4/2002 | Hirsch | |
| 6,475,315 B1 | 11/2002 | Kean et al. | |
| 6,953,119 B1 | 10/2005 | Wening | |
| 7,060,211 B2 | 6/2006 | Oda | |
| 7,419,058 B2 | 9/2008 | Wening | |
| 7,635,099 B1 | 12/2009 | Meredith et al. | |
| 7,767,141 B2 | 8/2010 | Andersson | |
| 7,784,399 B2 | 8/2010 | Sasine et al. | |
| 2002/0002764 A1* | 1/2002 | Putnam .................. | D04H 1/48 28/104 |
| 2002/0124366 A1 | 9/2002 | Hirsch | |
| 2002/0132960 A1 | 9/2002 | Haile et al. | |
| 2003/0003249 A1* | 1/2003 | Benim ............... | B65D 81/3886 428/35.7 |
| 2003/0157854 A1 | 8/2003 | Miller et al. | |
| 2005/0020171 A1 | 1/2005 | Yoshida et al. | |
| 2005/0079325 A1 | 4/2005 | Putnam et al. | |
| 2006/0075896 A1 | 4/2006 | Andersson | |
| 2008/0014817 A1* | 1/2008 | Zafiroglu ............... | D04H 1/485 442/148 |
| 2008/0305134 A1 | 12/2008 | Lucas | |
| 2009/0173055 A1 | 7/2009 | Silver | |
| 2010/0092746 A1* | 4/2010 | Coant ..................... | D04H 1/54 428/219 |
| 2010/0203788 A1 | 8/2010 | Kimura et al. | |
| 2011/0034100 A1 | 2/2011 | Narayanan et al. | |
| 2011/0200807 A1 | 8/2011 | Shofner et al. | |
| 2012/0060283 A1 | 3/2012 | Campasano | |
| 2015/0123304 A1 | 5/2015 | Ashraf et al. | |
| 2015/0291762 A1 | 10/2015 | Watanabe et al. | |
| 2019/0153643 A1 | 5/2019 | Ferrell et al. | |

FOREIGN PATENT DOCUMENTS

| | | |
|---|---|---|
| EP | 0 672 593 A2 | 9/1995 |
| JP | H07-258939 A | 10/1995 |
| JP | H09-299192 A | 11/1997 |
| JP | 2007-254904 A | 10/2007 |
| TR | 201401076 U | 8/2015 |
| WO | WO 2013/182801 A1 | 12/2013 |
| WO | WO 2016/083667 A1 | 6/2016 |
| WO | WO 2017/179030 | 10/2017 |

OTHER PUBLICATIONS

U.S. Appl. No. 15/469,124, filed Mar. 24, 2017, Wahlquist.
U.S. Appl. No. 15/861,006, filed Jan. 3, 2018, Ferrell.

(56) References Cited

OTHER PUBLICATIONS

Pure Process, The Refreshing difference of PURE, www.pureroom.com/pure_process, 1 page, Feb. 1, 2017.
Behind Pureroom, PURE's Patented, 7-Step Purification Process, www.pureroom.com/pure_process/behind_pureroom, 1 page, Feb. 1, 2017.
Pure at Home, Live the PURE Life, www.pureroom.com/pure_home, 3 pages, Feb. 1, 2017.
Kharpal, Arjun, Amazon wins patent for a flying warehouse that will deploy drones to deliver parcels in minutes, www.cnbc.com/2016/12/29/amazon-flying-warehouse-deploy-delivery-drones-patent.html, 4 pages, Dec. 30, 2016.
Potts et al., "Recycling for the Hospitality Industry A Guide for Instituting Recycling Programs in Hotel and Motel Properties", Clemson University, Extension, http://www.hcpcme.org/environment/hotel/hotelrecyclingguide.pdf, date of publication unknown however Reference V (EPA) shows at least Aug. 2011 (Year: 2011).
EPA, "EIA Technical Review Guidelines: Tourism-Related Projects," Aug. 2011, vol. 1, https://www.epa.gov/sites/production/files/2014-04/documents/tourismvol1.pdf (Year: 2011).
Doubletex, "Blankets made from recycled fibers," Doubletex, Archive date of Jan. 10, 2012, https://web.archive.org/web/20120110142207/http://www.doubletex.com/main.aspx?p=19&l=en (Year: 2012).
Michael Kanellos, "Eucalyptus Sheets and Recycled Plastic Thread: Greening the Hotel," Greentech Media, Oct. 2009, https://www.greentech media.com/articles/read/eucalyptus-sheets-and-recycled-plastic-curtains-greening-the-hotel#gs.gzg1Cc (Year: 2009).
O Ecotextiles, "Is recycled polyester fabric Recyclable?", O Ecotextiles, Jan. 31, 2010, https://web.archive.org/web/20100131093409/https://oecotextiles.wordpress.com/2009/11/11/is-recycled-polyester-fabric-recyclable/ (Year: 2010).
Sophia Bennett, "How to Recycle Fabric," May 22, 2014, Recycle Nation, https://recyclenation.com/2014/05/recycle-fabric (Year: 2014).
Elizabeth Claire Alberts, "Recycled Plastic Clothing: Solution or Threat?," Earth Island Journal, Dec. 15, 2014, http://www.earthisland.org/journal/index.php/articles/entry/recycled_plastic_clothing_solution_or_threat/ (Year: 2014).

* cited by examiner

METHOD FOR FORMING A NON-WOVEN RECYCLABLE FABRIC

CROSS-REFERENCE TO RELATED PATENT APPLICATION

This patent application is a continuation-in-part of co-pending U.S. patent application Ser. No. 15/469,124, filed Mar. 24, 2017, the entire teachings and disclosure of which are incorporated herein by reference thereto.

FIELD OF THE INVENTION

This invention generally relates to fabrics and more particularly to non-woven limited use recyclable fabrics.

BACKGROUND OF THE INVENTION

Most reusable linens used in hotels and other institutions are composed of bleached cotton or to a lesser extent, a virgin cotton/polyester blend. Cotton is one of the most resource intensive agricultural crops on the planet in terms of land use, water use, pesticide and herbicide use necessary to grow and bleach the cotton to a form which can be used in bed linens. The global average amount of water required to grow and bleach cotton is approximately 2,000,000 gallons/tonne of bleached cotton produced. As an example, the average amount of water required to grow and bleach cotton for one queen size sheet is approximately 3447 gallons.

Beyond being resource intensive in their production, reusable linens of the type mentioned above require significant resource expenditure in order to reuse the same, especially in high occupancy facilities, e.g. hospitals, hotels, prisons, cruise ships, etc., where such linens must be regularly cleaned and sanitized. Indeed, after each use, such linens must be washed in harsh disinfecting chemicals, dried, ironed and folded requiring additional water, energy, labor and producing additional waste water that must be treated by municipal treatment systems. In short, a significant amount of resources are expended for the continued use of such reusable linens. While reducing water, energy, and labor consumption to reuse such linens is desirable, the reduction of water consumption is becoming important as fresh water is becoming increasingly limited and more costly in many parts of the world.

In many North American cities water is becoming a very scarce resource. To address this, various governmental agencies are considering or have already enacted regulations which force high occupancy facilities to choose between reducing their water consumption or reducing their room capacity. In the hotel setting, a reduction of rentable rooms would make most hotels non-profitable. To avoid the foregoing, rents would likely increase, thus harming everyone in the commerce chain.

Reducing the water, energy footprint and sewage discharge improves a hotel's LEED (Leadership in Energy and Environmental Design) rating. Improved environmental ratings such as a LEED rating can provide a competitive advantage as many companies and conventions base their hotel choices on LEED ratings. Hotel properties can improve their LEED ratings by installing hardware to reduce energy and water foot print, or they can buy carbon credits, but both options are considerably expensive, and they do not address the root cause: the use of linens which are washed.

Further, use of reusable linens requires a significant amount on hand labor in the high occupancy setting. However, increasing regulations regarding working wages and immigration have made it difficult to Hoteliers to effectively and efficiently staff such positions. As a result, the cost of implementing reusable linens has increased as a result of these factors as well.

Still further, reusable linens are not a highly efficient reusable resource. Indeed, many high occupancy facilities have recorded that a typical annual loss of such linens is averaging 20%-30% due to damage and contamination. As such, a significant cost of operation arises from implementing a reusable linen framework, given such an annual loss.

Reusable linens also implicate the use of very harsh chemicals to clean and sanitize the same. Indeed, such chemicals are required to kill germs and bacteria, as well as bedbugs and the like. Such harsh chemicals can lead to minor, and in some cases severe, skin irritations for consumers sleeping on washed linens.

Despite the use of the aforementioned harsh chemicals, mold continues to persist as an inherent problem with reusable linens, especially those made of a cotton/rayon material. Indeed, mold is a very hardy organism and is ubiquitous in nature. In its dormant spore state it can live under very harsh conditions and then become active as conditions for its growth improve. Mold primarily needs two things to become active and grow: moisture and a food source. In the context of reusable linens, moisture can come from a variety of sources, including improper drying, improper storage or even a wet environment caused by a user through body fluids or perspiration. Further, mold has an affinity for substances which are high in carbohydrates or sugars, like those found in the cotton and rayon found in reusable linens. Mold outgrowth in reusable linens has been identified as the source of minor injuries such as skin irritations and sickness as well as fatalities in some cases.

There have been attempts to address the above concerns by using disposable nonwoven fabrics. However, such disposable fabrics are not without their drawbacks.

Disposing of limited use linens into a landfill or by incineration creates unacceptable waste and pollution that would reduce a facilities LEED rating and would be rejected by high volume users. One common process for recycling such nonwoven based fabrics is referred to as garneting. In this process the fabric is torn apart into small pieces (clumps of fibers) and used for different commodity applications such as stuffing or padding. The garneting process breaks and degrades the fibers, does not sterilize the fibers and does not put them back into a single fiber form that can be easily used in a nonwoven process for producing additional fabric for use in bed linens.

Further, consumers report that these typical nonwoven recyclable fabrics feel scratchy and abrasive to the skin on more sensitive parts of the body, including the face, torso, arms and legs when in a sleeping position. Consumers also report that contemporary nonwoven recyclable fabrics feel warm to the touch compared to woven linens. While all fabrics will equilibrate to the temperature of the room, the thermal conductivity and insulation value of the fabric can make a significant difference in how the "coolness" or "warmness" of a fabric is perceived in use by consumers. Currently, contemporary nonwoven recyclable fabrics do not provide adequate thermal conductivity and low insulation values which approach those of their reusable textile counterparts.

Accordingly, there is a need in the art for a nonwoven recyclable fabric and associated method which, on the one hand, function as a near equivalent to their reusable counterparts in terms of feel, comfort, and desirability, while on the other hand provide improvements in the environmental footprint (energy and waste), labor cost, hygiene, and skin sensitivity of the linens. The invention provides such a nonwoven recyclable linen and associated method. These and other advantages of the invention, as well as additional inventive features, will be apparent from the description of the invention provided herein.

BRIEF SUMMARY OF THE INVENTION

In one aspect, the invention provides a nonwoven recyclable fabric which may be readily formed into a product, for example a bed sheet or pillow case. An embodiment of such a nonwoven, recyclable fabric includes a plurality of high melt polyester fibers hydroentangled with one another and a low melt polyester binder interspersed with the plurality of high melt polyester fibers binding the plurality high melt polyester fibers to one another. The low melt polyester binder is obtained by melting outer sheaths of a plurality of bicomponent polyester fibers. Each one of the plurality of bicomponent polyester fibers has a high melt polyester core and a low melt polyester outer sheath. The high melt polyester cores form part of the plurality of high melt polyester fibers.

In an embodiment according to this aspect, the plurality of high melt polyester fibers and the high melt polyester core of each one of the plurality of bicomponent polyester fibers have a melting point of at least about 250° C. The low melt polyester outer sheath of each one of the plurality of bicomponent fibers has a melting point not greater than about 150° C.

In embodiments according to this aspect, the fabric has a density of greater than 0.15 gr/cm3. The fabric is free of a chemical binder. The fabric may also include a hydrophilic coating. In a subsidiary embodiment, the hydrophilic coating may be silicone.

In another aspect, the invention provides a nonwoven recyclable product. An embodiment according to this aspect includes a nonwoven, recyclable fabric that includes a plurality of high melt polyester fibers hydroentangled with one another and a low melt polyester binder interspersed with the plurality of high melt polyester fibers binding the plurality high melt polyester fibers to one another. The low melt polyester binder is obtained by melting outer sheaths of a plurality of bicomponent polyester fibers. Each one of the plurality of bicomponent polyester fibers has a high melt polyester core and a low melt polyester outer sheath. The high melt polyester cores form part of the plurality of high melt polyester fibers.

In an embodiment according to this aspect, the product is one of a bed sheet and a pillow case.

In an embodiment according to this aspect, the product includes a color changing indicator. The color changing indicator exhibiting a color change after skin contact.

In an embodiment according to this aspect, the product is a bed sheet and includes an embossed region adjacent an edge of said bed sheet.

In yet another aspect, the invention provides a method for forming a nonwoven recyclable fabric for use as a product. An embodiment according to this aspect includes procuring a plurality of used nonwoven fabric products, wherein each of the plurality of nonwoven fabric products is formed of one hundred percent polyester fibers. The method also includes melting the plurality of used nonwoven fabric products to form a molten polymer and extruding the molten polymer to form a bulk mass of monocomponent fibers. The method also includes adding bicomponent fibers to the bulk mass of monocomponent fibers to form a fiber mixture, carding the fiber mixture to form a fiber web, and hydroentagling said fiber web to form a hydroentangled web. The method also includes drying the hydroentangled web in a drying oven and calendering the hydroentangled web to a predetermined thickness and density.

In an embodiment according to this aspect, the method may also include winding the hydroentangled web onto a roll after the step of compacting.

In an embodiment according to this aspect, the step of drying includes melting the outer sheaths of the bicomponent fibers in a drying oven to form a polyester binder interspersed throughout the hydroentangled web.

In an embodiment according to this aspect, the step of calendering includes melting said the sheaths of said bicomponent fibers in a roller arrangement to form a polyester binder interspersed throughout the hydroentangled web.

In an embodiment according to this aspect, the step of adding the bicomponent fibers includes adding the bicomponent fibers such that the fiber mixture comprises about 3% to about 10% by weight bicomponent fibers. The use of percentages by weight herein includes deviations for unavoidable impurities. In a subsidiary embodiment, the step of adding the bicomponent fibers includes adding the bicomponent fibers such that the fiber mixture comprises about 7% by weight bicomponent fibers.

In an embodiment according to this aspect, the method includes applying a hydrophilic coating at one of prior to or after the step of hydroentangling. In a subsidiary embodiment, applying the hydrophilic coating includes applying a silicone coating. In a further subsidiary embodiment, applying the silicone coating includes applying the silicone such that it amounts to not greater than ten percent by weight of the fabric.

In an embodiment according to this aspect, the step of drying includes drying the hydroentangled web to less than about 7% moisture. In a subsidiary embodiment, the step of drying includes drying the hydroentangled web to not greater than about 2% moisture.

In an embodiment according to this aspect, the step of extruding is performed with the molten polymer at a temperature above about 275° C. In a subsidiary embodiment, the step of extruding is performed with the molten polymer at a temperature of about 290° C.

In another aspect, the invention provides a nonwoven, recyclable fabric. An embodiment of such a fabric according to this aspect includes recyclable polyester fibers produced via melt extrusion from a first polyester polymer sourced from a plurality of polyester fiber products blended with a virgin polyester polymer in a ratio of about 1:99 to about 35:65 of first polyester polymer to virgin polyester polymer. This embodiment also includes other polyester fibers having a different source than said recyclable polyester fibers. A ratio of said recyclable polyester fibers to said other polyester fibers is about 25:75 to about 99:1 to form the nonwoven, recyclable polyester fabric. The nonwoven recyclable fabric has a density of no less than about 0.15 g/cm3. The nonwoven recyclable fabric has a thermal resistance value of less than about 0.025 K-m2/W per ASTM F1868-14. The nonwoven recyclable fabric has an abrasion resistance of greater than or equal to 750 cycles under the Wyzenbeek abrasion test method per ASTM D4157.

In an embodiment according to this aspect, the nonwoven recyclable fabric is mechanically treated by calendaring to obtain said thermal resistance value and said abrasion resistance.

In an embodiment according to this aspect, the other polyester fibers are bicomponent polyester fibers. The bicomponent polyester fibers are formed of a sheath polyester and a core polyester. The sheath polyester has a melting point at least about 50 degrees Celsius below that of the core polyester.

In an embodiment according to this aspect, the nonwoven recyclable fabric includes a hydrophilic coating.

In an embodiment according to this aspect, a product may be provided which utilizes the nonwoven recyclable fabric described above. The product may for example be a hospitality or bedding linen, such as a a bed sheet or a pillow case, a duvet cover or mattress cover. In the case of a bed sheet for example, the product can also include an embossed region adjacent to an edge of said bed sheet.

In an embodiment according to this aspect, the nonwoven recyclable fabric is formed from a fiber web that is carded or airlaid and which is then hydroentangled or thermal bonded.

In an embodiment according to this aspect, the nonwoven recyclable fabric is a spunbond or spunbond/meltblown/spunbond web that is hydroentangled or thermal bonded.

In yet another aspect, a method for forming a nonwoven recyclable fabric is provided. An embodiment of such a method includes procuring a plurality of used nonwoven fabric products, wherein each of the plurality of nonwoven fabric products is formed of one hundred percent polyester fibers. The one hundred percent polyester fibers are used as the source of polymer for a melt extrusion process by producing recycled polyester flake or pellets which are then spun into recycled polyester fibers via said melt extrusion process. This embodiment also includes also forming a fiber web from said recycled polyester fibers and bonding and mechanically treating said fiber web to produce said nonwoven recyclable fabric. The nonwoven recyclable fabric has a density of no less than 0.15 g/cm3, a thermal resistance value of less than about 0.025 K-m2/W per ASTM F1868-14, and an abrasion resistance of greater than or equal to 750 cycles under the Wyzenbeek abrasion test method per ASTM D4157.

In an embodiment according to this aspect, the fiber web used to produce said nonwoven recyclable fabric is comprised of a blend comprising a ratio of about 1:99 to about 35:65 of said recyclable polyester fibers to virgin polyester fibers, and where at least five per cent of the virgin polyester fibers contain a polyester component that has a melting point at least 50 degrees Celsius below the melting point of said recyclable polyester fibers. The virgin polyester fibers are bicomponent polyester fibers comprising a sheath polyester and a core polyester, the sheath polyester having a melting point at least about 50 degrees Celsius below that of said recyclable polyester fibers.

In an embodiment according to this aspect, the method also includes a step of carding said fiber mat.

In an embodiment according to this aspect, the method also includes a step of thermal bonding or adhesive bonding of the recyclable nonwoven fabric. The thermal bonding is at least one of thermal point bonding, thermal calender bonding, through air bonding, ultrasonic bonding. The step of forming said fiber web includes forming the fiber web via spunbonding or meltblowing.

In an embodiment according to this aspect, the method also includes introducing a hydrophilic coating to said recyclable nonwoven fabric.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

Figure 1:
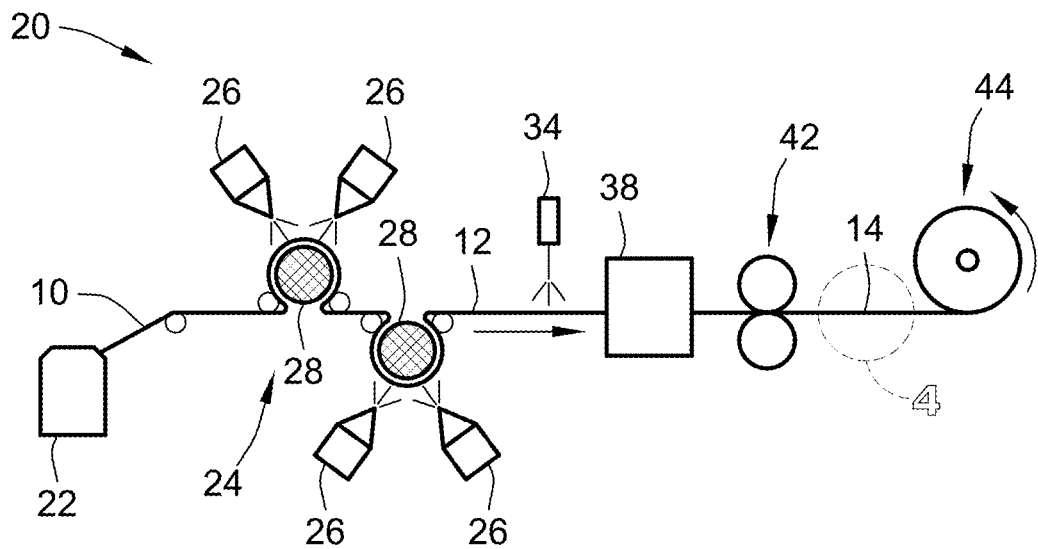
FIG. 1 is a schematic representation of an exemplary embodiment of a process for forming a fabric according to the teachings herein.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Turning now to the drawings, a recyclable nonwoven fabric, products formed from this fabric, and a method of producing the fabric are described herein. The embodiments described advantageously overcome existing problems in the art by providing a nonwoven recyclable product which is readily recyclable while at the same time achieving desirable softness and coolness characteristics heretofore unachieved by prior nonwoven designs. While the following will describe an application of the fabric in a product such as a sheet or pillow case, it will be readily recognized that the fabric may be utilized in any product where a recyclable fabric is desired.

As will be described in greater detail below, the fabric is formed using only polyester fibers. Advantageously, using this single material type allows for a highly efficient recycling process which purifies, sterilizes, and rextrudes the fibers into a form which may be reused in a nonwoven, textile, or other process.

In particular, the fabric is formed from a blend of high melt monocomponent polyester fibers and bicomponent polyester fibers. The monocomponent fibers are obtained by melting down used fabric according to the teachings herein and extruding the same back into monocomponent fibers. The bicomponent fibers are added to the extruded monocomponent fibers as described below. It will be noted from the following that the bicomponent fibers may be virgin or recycled fibers. The term "virgin" as used herein in the context of fibers means that the fibers are newly manufactured fibers, in contrast to the monocomponent fibers mentioned above which are recovered from existing fabric via a recycling process.

The term "monocomponent" as used herein in the context of fibers means fibers which are formed of a single species of material and are homogeneous in their material properties. Conversely, the term "bicomponent" as used herein in the context of fibers means fibers which are formed with two polyester polymers having different melting points. Indeed, the bicomponent fibers are polyester fibers which have a high melt core and an outer low melt sheath. The core of the bicomponent fiber is made with polyester polymer with a melting point of about 270° C. The outer sheath of the bicomponent fiber is made with polyester polymer that has had its melting point reduced to the range of 130-150° C. by the addition of isophthalic acid, as a non-limiting example.

As such, the bicomponent fibers are formed from one species of polyester which serves as the core material, and another species of polyester which serves as the outer sheath. The phrase "high melt" used herein in the context of fibers means fibers which have a higher melting point in comparison to a low melt fiber. As a non-limiting example, a high melt fiber may exhibit a minimum melting point of about 270° C. Ideally, the melting point is at least high enough to sterilize the melted polyester.

The phrase "low melt" used herein in the context of fibers means a fiber with a melting point which is lower in comparison to a high melt fiber. As a non-limiting example, a low melt fiber may exhibit a melting point of not greater than about 130° C.-150° C. The approximate terms "about" used relative to melting temperature is used to allow for ordinary deviations in a specified melting point of a polyester material known in the art. Put differently, high melt fibers have a first melting point, while low melt fibers have a second melting point, the second melting point being less than the first melting point.

Figure 2:
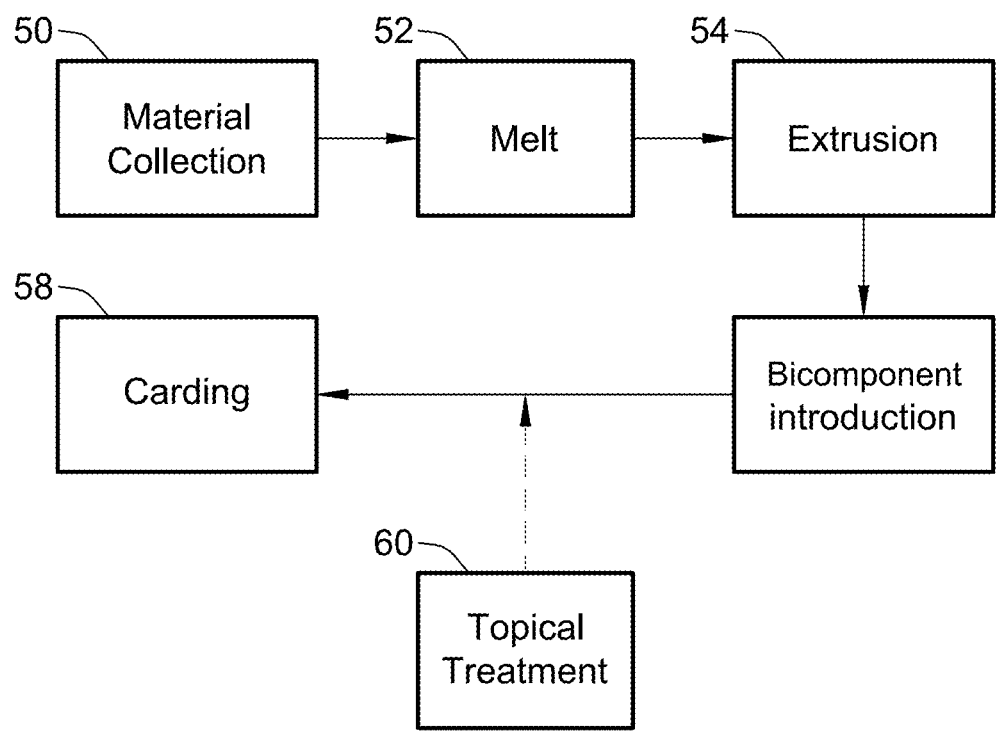
FIG. 2 is a schematic representation of an exemplary embodiment of a fiber preparation and web formation of the process of FIG. 1.

With particular reference to FIG. 1, the same illustrates schematically a portion of a process 20 of forming a nonwoven recyclable fabric 14 according to the teachings herein. In particular, FIG. 1 depicts a process which includes a step of carding of the fibers, hydroentangling the fibers, surface treatments, and drying of the fibers. Process 20 includes a fiber preparation stage 22. At this stage, fibers provided by the invention herein are blended and carded. Blending is done to achieve a desired blend of monocomponent fibers and bicomponent fibers. During this stage, monocomponent polyester fibers obtained via the process described below relative to FIG. 2 are blended with bicomponent polyester fibers. The bicomponent polyester fibers may be virgin or recycled.

Carding may be achieved using a contemporary carding arrangement. For non-limiting example, carding may be achieved via a drum carder, cottage carder, or similar devices operable to disentangle and orient the fiber mixture such that the fibers thereof are generally parallel to one another.

Once blended and carded, a fiber web 10 is produced. Fiber web 10 generally possesses a number of monocomponent and bicomponent polyester fibers arranged parallel to one another. Fiber web 10 enters a hydroentangling arrangement 24 where the fibers thereof are hydroentangled with one another using one or more hydroentangling jets 26 and hydroentangling cylinders 28.

The result is a hydroentangled web 12. This hydroentangled web 12 may then receive a topical treatment such as a hydrophilic coating applied via an application head 34. Thereafter, hydroentangled web 12 is dried in a drying oven 38. The dried hydroentangled web 12 is then fed through a roller arrangement 42 which, inter alia, compacts hydroentangled web 12 to a predetermined thickness and density to complete the formation of the fabric 14 described herein. Thereafter, post-processing steps may occur. For example, fabric 14 may be wound onto a roll 44 for later formation into a product, e.g. a product. With the foregoing general process layout in hand, the following described each step and its associated structure in greater detail.

Turning now to FIG. 2, the same illustrates another stage of the process herein. Indeed, FIG. 2 shows in schematic detail a recycling process for recycling fabric 14. In particular FIG. 2 includes a material collection step 50, in which used fabric 14 is collected. The collected used fabric 14 may be delivered to a facility having the necessary equipment for the densification, melting, and extrusion of fibers.

As a non-limiting example, the used products may be a plurality of used products, e.g. sheets, pillow cases, etc., formed from fabric 14 and recovered from a high occupancy facility such as a hotel which are gathered or bundled in bulk. These gathered products may initially be scanned to ensure there is no foreign material, e.g. jewelry, litter, fabrics which differ from fabric 14, etc., incorporated therein. This scanning may be done via any contemporary manner, e.g. visual metal detection, x-ray, magnetic or mechanical separation, etc. Thereafter, the used fabric 14 is densified into a pellet like substance during material collection step 50.

Once it is ensured that the gathered products are free of foreign material and the gathered fabric 14 has been densified, the gathered products are then melted at step 52 to form a liquid polyester. As stated above, one hundred percent of the fibers in fabric 14 are polyester, i.e. no other fibers of different materials are present. Further, fabric 14 is predominantly formed of high melt polyester, and thus exhibits a melting point property in the range of a high melt polyester. As a result, the melting process is a high melt process requiring a sufficient temperature to melt used fabric 14 into a liquid state.

This melting step 52 contemplates the use of any known controlled melting means typically employed in the melt extrusion process. After melting, the liquid polyester is then extruded at an extrusion step 54. This extrusion may be accomplished via any contemporary fiber extrusion process, including but not limited to melt spinning This extrusion process is a high temperature process (i.e. a temperature above about 275° C.), and thus provides additional sterilization beyond that provided by the initial melting step 52. It should be noted that the resultant product at this stage is a bulk mass of high melt monocomponent polyester fibers. These monocomponent polyester fibers are then ready for processing at fiber preparation stage 22 discussed above relative to FIG. 1.

As stated above, the bicomponent polyester fibers may be virgin or recycled. In the case of recycled bicomponent polyester fibers, a similar process to what is shown in FIG. 2 is conducted. Indeed, to form the bicomponent fiber, used fabric 14 is collected, densified, and melted, i.e. steps 50 and 52 are conducted to form the bicomponent fibers.

Thereafter, low melt bicomponent polyester fibers are introduced to the bulk mass of monocomponent polyester fibers at step 22. It is envisioned that this addition will be done as a continuous process where a known quantity of virgin bicomponent polyester fibers are added. The result is a fiber mixture. This fiber mixture may for example comprise about 3%-10% bicomponent polyester fibers, with the balance being the extruded monocomponent polyester fibers.

Figure 3:
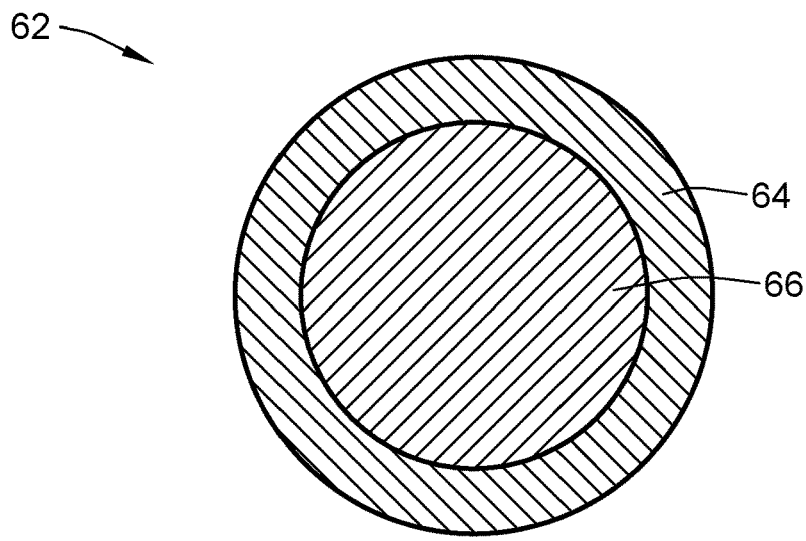
FIG. 3 is a cross sectional view of a bicomponent fiber used to form the fabric according to the teachings herein.

With momentary reference to FIG. 3, a typical cross section of a bicomponent fiber 62 is illustrated. As can be seen in this view, bicomponent polyester fiber 62 has a low melt polyester outer sheath 64 and a high melt polyester core 66 surrounded by sheath 64. As discussed below, during processing, sheath 64 melts off of core 66. Core 66 is thus the same as those high melt monocomponent polyester fibers extruded at extrusion step 54. The melted core material serves as a binder which fuses to adjacent high melt monocomponent polyester fibers to provide added strength as discussed below.

Returning now to FIG. 1, once the fiber mixture is formed at step 22, it is then ready to undergo a carding process. Optionally, a topical treatment may be applied in addition to or in place of the topical treatment applied by application head 34 shown in FIG. 1. This topical treatment may for example be a hydrophilic treatment, e.g. a silicone coating. Alternatively, coatings may be applied during extrusion step 52.

While illustrated as occurring prior to carding step 58, topical treatment step 60 may also occur after carding step 58. Further, any number of topical treatments could be applied beyond the hydrophilics mentioned above. While silicon advantageously promotes smoothness and glide, it has also been found to promote moisture wicking and moisture vapor transmission. The foregoing qualities achieved via silicone coatings thus also promote the "cool" feeling of fabric 14. Nevertheless, it is also contemplated that any other coating could be employed which on the one hand is suitable for human contact and on the other promotes moisture wicking and moisture vapor transmission through fabric 14, and possesses desirable smoothness.

Referring back to FIG. 1, once carding at step 58 is completed, a fiber web 10 is formed which is ready to be hydroentangled using hydroentangling arrangement 24. Fiber web 10 may be fed via any conventional webbing conveying arrangement, e.g. rollers, to hydroentangling arrangement 24. As introduced above, hydroentangling arrangement includes a plurality of hydroentangling jets 26 and a plurality of hydroentangling rollers. Jets 26 act upon fiber web 10 in the region of rollers 28 to entangle adjacent fibers of fiber web 10, thereby forming a hydroentangled web 12. Hydroentangling arrangement 24 may be any contemporary system used for hydroentanglement applications to form nonwoven fabrics.

Hydroentangled web 12 may then receive a topical treatment via applicator head 34. Applicator head 34 may apply the same or similar substances as those described above relative to optional topical treatment step 60 shown in FIG. 2. It should also be noted that applicator head 34 may include multiple heads to apply treatments to both sides of hydroentangled web 12. Hydroentangled web 12 is then dried via a drying oven 38. Drying oven 38 may be set to a temperature which not only dries hydroentangled web 12, but also activates or melts outer sheath 64 of the bicomponent polyester fibers 62 (See FIG. 3). Alternatively, drying oven 38 may be set to a temperature high enough to dry hydroentangled web 12 to a desired moisture percentage. For example, hydroentangled web 12 may be dried to less than about 7% moisture. As another example, hydroentangled web 12 may be dried to not greater than about 2% moisture.

After drying, hydroentangled web 12 enters a roller arrangement 42. Roller arrangement 42 includes compaction rollers for compacting hydroentangled web 12 to a desired thickness and density. These compaction rollers may be embodied by heated calendering rolls which serve to compact hydroentangled web 12. The temperature of such calendering rolls may be such that the same activate outer sheath 64 of bicomponent polyester fibers 62 such that the above described binding properties of melted sheath 64 are achieved simultaneously while compaction occurs.

It should be noted that the above mentioned calendar rollers of roller arrangement 42 have a high degree of smoothness to provide an ironing like effect to hydroentangled web 12 to produce a smooth, drapable fabric 14 which is soft to the touch and suitable for skin contact. Once compaction is complete, fabric 14 is produced. Fabric 14 may then be taken up in bulk on a winding roll 44. Thereafter, subsequent operations may be performed on fabric 14 to form the same into a product as discussed below.

Figure 4:
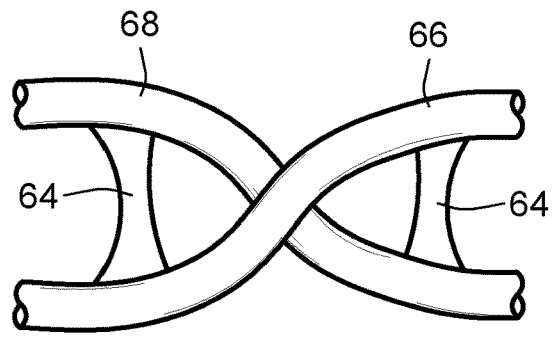
FIG. 4 is a partial view of a fabric produced from the process of FIG. 1, illustrating the fibers of said fabric and a binder associated with said fibers.

Turning briefly to FIG. 4, the same illustrates an exemplary cross section taken through the thickness of fabric 14. As can be seen therein, core 66 is bonded or attached to adjacent monocomponent polyester fiber 68 via the melted sheath material 64. This configuration advantageously adds strength to fabric 14, which in turn promotes abrasion resistance, resistance to pilling, density, and provides added strength for subsequent stitching, embossing, or other steps necessary to produce a product from fabric 14.

As stated above, core material 66 is configured such that it is highly similar or the same as the base monocomponent polyester fibers in terms of fiber diameter, melting point, tensile strength, etc. In effect, the resultant fabric 14 is a grouping of highly similar or identical monocomponent polyester fibers bound to one another via a binder formed via melted sheath 64. Notably, this binding functionality is achieved via the low melt polyester of sheath 64. No solution or emulsion chemical binders are required. Put differently, fabric 14 is free of topical binding chemistry. Such a configuration advantageously avoids the need to remove any chemical by products which may not be suitable in the final product. Further, such a configuration advantageously avoids the need for an additional chemical binding step. Instead, fiber-to-fiber binding is achieved simultaneously during drying and/or compaction as discussed above.

Figure 5:
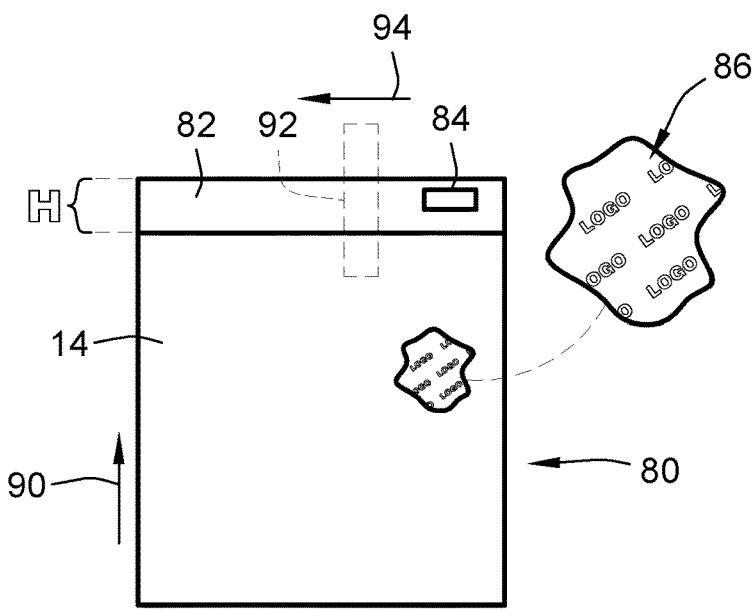
FIG. 5 is an exemplary embodiment of a product produced from the fabric shown in FIG. 3.

Turning now to FIG. 5, the same illustrates an exemplary product formed using fabric 14. In the illustrated example, the product is a bed sheet 80. Bed sheet 80 includes an embossed hem region 82 having a height H to aid in the orientation of sheet 80 in bed. This embossed hem region 82 may include a decorative pattern, and may be provide prior to winding onto roller 44. Indeed, this embossed hem region 82 may be applied via an embossing roller forming a part of roller arrangement 42. Alternatively, hem region 82 may be embossed subsequently during the formation of fabric 14 into sheet 80. The embossed hem may be produced using a patterned heated calendar, an ultrasonic bonding unit, hydro-embossing, or printing.

Further, sheet 80 may also include a use indicator 84. This use indicator 84 may for example be a color changing indicator which changes color upon contact with human skin or other bodily fluids. This color change could occur in response to a detection of a particular pH associated with human skin (typically a pH value of 5.5) for example. Additionally or in the alternative, such indicators could be incorporated as a stylized pattern 86 such as that illustrated. In either case, the indicators would advantageously allow the staff of a high occupancy facility to quickly determine whether or not sheet 80 has been used and is ready to be collected for recycling.

To obtain sheet 80, fabric 14 may be unwound from roll 44, cut to length, embossed with hem region 82. Further, indicator 84 can be emplaced and/or stylized pattern 86 could be added. It is contemplated that this could be achieved at the same facility which employs process 20 described above relative to FIG. 1 using a separate or integrated process line for forming the aforementioned product. In an integrated configuration, fabric 14, upon leaving roller arrangement 42, could continue to undergo processing steps to form the same into a product as opposed to being wound on roll 44. Alternatively, fabric 14 may be supplied in roll form on roll 44 to another facility for subsequent processing into products.

Further, it is also contemplated that sheet 80 may be expeditiously folded. This expeditious folding methodology would be highly useful in high occupancy facilities, allowing staff to quickly place sheet 80 on a bed. This folding methodology contemplates a folding process where sheet 80 is fan folded, rolled in a folded state on a mandrel, and then flattened after removing the mandrel. More specifically, sheet 80 may be repeatedly fan folded moving from the bottom most edge of sheet 80 in FIG. 5, to the top most edge of sheet 80 in FIG. 5 (i.e. towards hem region 82) in a first direction 90. Thereafter, folded sheet 80 may be rolled on a mandrel 92 moving in a second direction 94 perpendicular to the first direction (i.e. from left to right or vice versa in FIG. 5). Thereafter mandrel 92 could be removed and the rolled sheet 80 flattened.

To unfold sheet 80, a reverse process is employed. Flattened sheet 80 can be situated at the upper corner of a bed and rolled to the other side of the bed, effectively undoing the roll of sheet 80 formed via mandrel 94. Thereafter, the end of sheet could be pulled from the upper end of the bed to the lower end of the bed, thus covering the bed with sheet 80 in an unfolded configuration.

In addition to sheet 80 as discussed above, it is also contemplated that the fabric of the instant invention may be advantageously employed as a pillow case. Indeed, the same advantages of wicking, drapability, softness, coolness described above are equally achieved by forming fabric 14 into a pillow case. A sheet and pillow case are only two of many examples of the application of fabric 14, and thus should be taken by way of example and not limitation. As discussed above, fabric 14 may be employed in any application where a nonwoven recyclable fabric which has desirable wicking, drapability, softness, and coolness characteristics.

It also conceived that the above described spunlacing process 20 may instead be a woven process. Indeed, recycled fibers may be achieved via the process shown and described relative to FIG. 2. Thereafter, the fibers may be blended and carded as described above via step 22. The blended fibers may then be subjected to a woven process and achieve the same advantages as described herein.

In another advantageous configuration, the recyclable polyester fabric 14 produced according to the teachings herein may comprise a blend of recyclable polyester fibers and other polyester fibers which are blended together at step 22 shown in FIG. 1, which may include carding as described above. The phrase "other polyester fibers" as used herein means polyester fibers which are any polyester fibers other than the recyclable polyester fibers.

While it is contemplated by the invention herein disclosed that the specific ratio of recyclable polyester fibers to other polyester fibers may be any ratio, the Applicants have found a blend of at least about twenty-five percent by weight recyclable polyester fibers with the balance being the other polyester polymer fibers to be ideal. In one possible embodiment, the Applicants have found that a ratio of about 25:75 to about 99:1 of the recyclable polyester fibers to other polyester fibers is particularly advantageous. Each value in the foregoing ratios are in terms of weight versus total weight.

With regard to the recyclable polyester fibers, the same may be obtained via melt extrusion from a blend of a first polyester polymer and a second polyester polymer. The first polyester polymer is obtained from a plurality of polyester fiber products which have been melted down and flaked or pelletized for purposes of melt extrusion (see e.g. step 50 of FIG. 2), and the second polyester polymer is a virgin polyester polymer. Similar to the meaning of virgin polyester fibers mentioned above, "virgin polyester polymer" means a non-recycled polyester polymer, i.e. a polyester polymer which is being used for the first time. While the ratio of the first polyester polymer to the second polyester polymer may be varied within the teachings of the invention, the Applicants have found that a ratio of about 1:99 to about 35:65 of the first polyester polymer to the second polyester polymer is particularly advantageous. Each value in the foregoing ratios are in terms of weight versus total weight. These ratios may be obtained for example during the melt step 52 shown in FIG. 2 and the fiber us thereafter extruded via the extrusion step shown for example in step 54 of FIG. 2.

With regard to the other polyester fibers, the same may be formed from any polyester homopolymer or copolymer, the bicomponent polyester fibers described above, or biconstituent polyester containing fiber. In the case of bicomponent polyester fibers, the same may have a sheath polyester and a core polyester as introduced above (see e.g. FIG. 3), with the sheath polyester exhibiting a melting point of about fifty degrees Celsius below that of the core polyester. Other melting point differentials between the core and sheath polyesters are possible, depending in part upon on how controllable the temperature is during the subsequent heating process, e.g. during drying, etc.

Alternatively, it is also conceived herein to produce fabric 14 without the introduction of other polyester fibers as described above. As one example, a plurality of polyester fiber products may be procured, and then flaked or pelletized, and then melted.

Similar to the products described above, the applicants have found that the aforementioned fabric is particularly useful when fashioned into a hospitality bedding or linen, a bed sheet or pillow case, a duvet cover or mattress cover, etc.

The Applicants have found that a recyclable polyester fabric utilizing the aforementioned blend of recyclable polyester fibers and other polyester fibers exhibits desirable thermal resistance and abrasion properties. Indeed, the Applicants have found that such a fabric 14 has a thermal resistance value of less than about 0.025 K-m2/W per ASTM F1868-14 as published on Jan. 1, 2019, and an abrasion resistance of greater than or equal to 750 cycles under the Wyzenbeek abrasion test method per ASTM D4157 as published on Jan. 1, 2019. To aid in such favorable properties, it is also contemplated by the invention to mechanically treat fabric 14 via calendering with calender rolls.

As mentioned above, the fiber web 10 produced to form fabric 14 may be carded at stage 22 in FIG. 1. It is also contemplated that stage 22 may include a step where the fibers are airlaid to produce the fiber web 10. Still further, it is also contemplated that stage 22 may include a step of spunbonding alone, a step of meltblowing alone, or a combined process of spunbonding a layer onto one or both sides of a meltblown layer, to form fiber web 10. In such an instance of utilizing carding, airlaying, spunbonding, meltblowing, or a combination thereof, fiber web 10 may thereafter be hydroentangled as described above, or may be thermally or adhesive bonded in the alternative. In an instance of thermal bonding, the same may be achieved via any one or combination of thermal point bonding, thermal calender bonding, through air bonding, ultrasonic bonding.

In general, hydroentanglement, thermal bonding, or adhesive bonding are considered to be equally viable steps of bonding fabric 14.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for forming a nonwoven recyclable fabric, the method comprising:
   procuring a plurality of used fiber products, wherein each of the plurality of fiber products is formed of one hundred percent polyester fibers;
   forming said one hundred percent polyester fibers into recycled polyester flake or pellets;
   melt extruding the polyester flakes or pellets into recycled polyester fibers via a melt extrusion process;
   forming a fiber web from said recycled polyester fibers;
   bonding and mechanically treating said fiber web to produce said nonwoven recyclable fabric, said nonwoven recyclable fabric having a density of no less than 0.15 g/cm$^3$, a thermal resistance value of less than about 0.025 K-m$^2$/W per ASTM F1868-14, and an abrasion resistance of greater than or equal to 750 cycles under the Wyzenbeek abrasion test method per ASTM D4157.

2. The method of claim 1 where said fiber web used to produce said nonwoven recyclable fabric is comprised of a blend comprising a ratio of about 1:99 to about 35:65 of said recyclable polyester fibers to virgin polyester fibers, and where at least five per cent of the virgin polyester fibers contain a polyester component that has a melting point at least 50 degrees Celsius below the melting point of said recyclable polyester fibers.

3. The method of claim 2 where at least a portion of said virgin polyester fibers are bicomponent polyester fibers comprising a sheath polyester and a core polyester, the sheath polyester having a melting point at least about 50 degrees Celsius below that of said recyclable polyester fibers.

4. The method of claim 1 further comprising a step of carding said fiber web.

5. The method of claim 4 wherein the step of bonding includes hydroentangling, thermal bonding or adhesive bonding of the recyclable nonwoven fabric.

6. The method of claim 5 where said thermal bonding is at least one of thermal point bonding, thermal calender bonding, through air bonding, ultrasonic bonding.

7. The method of claim 1 wherein the step of forming said fiber web includes forming the fiber web via spunbonding or meltblowing.

8. The method of claim 1, further comprising introducing a hydrophilic coating to said recyclable nonwoven fabric.

9. The method of claim 1, wherein the plurality of fiber products are nonwoven fabric products formed from polyester fiber.

10. The method of claim 1 wherein the step of procuring a plurality of used fiber products includes procuring nonwoven recyclable hospitality or bedding linen as the plurality of used fiber products.

11. The method of claim 10, wherein the procuring hospitality or bedding linen includes procuring bed sheets or a pillow cases.

12. The method of claim 10, wherein the procuring of the bed sheets includes procuring bed sheets having an embossed region adjacent to an edge of the bed sheets.

13. The method of claim 1, wherein the step of procuring a plurality of used fiber products includes procuring nonwoven recyclable duvet covers or mattress covers as the plurality of used fiber products.

14. The method of claim 10, wherein the step of procuring hospitality or bedding linen includes the step of collecting bedding hospitality or bedding linen having a use indicator, the use indicator indicating the hospitality or bedding linen has been used.

* * * * *